United States Patent

Watkins

[15] 3,661,506
[45] May 9, 1972

[54] MEANS AND METHOD OF ELIMINATING AND CONTROLLING MARINE FOULING

[72] Inventor: Lucius D. Watkins, Hartland, Wis.

[73] Assignee: Outboard Marine Corporation, Waukegan, Ill.

[22] Filed: Sept. 3, 1969

[21] Appl. No.: 854,979

[52] U.S. Cl. ..........................................21/58, 9/8 R, 21/2, 21/61, 43/131, 52/517, 61/54, 239/53, 239/57, 424/350, 424/351, 424/353
[51] Int. Cl. .....................................A01n 17/00, A01n 23/00
[58] Field of Search ............................21/58, 2, 61; 43/131; 239/53–57; 61/54; 52/517; 106/15; 424/350, 351, 353

[56] References Cited

UNITED STATES PATENTS

| | | |
|---|---|---|
| 2,441,553 | 5/1948 | Britton..............................424/350 X |
| 2,477,978 | 8/1949 | Graenacher et al................424/353 X |
| 2,804,420 | 8/1957 | Danish et al. ......................424/350 X |
| 2,865,702 | 12/1958 | Bruner..........................106/15 AF X |
| 2,904,602 | 9/1959 | Ilgenfritz...........................424/350 X |
| 2,978,338 | 4/1961 | Greathouse.......................106/15 AF |
| 3,121,753 | 2/1964 | Luvisi et al........................424/353 X |
| 3,155,569 | 11/1964 | Deinet..................................424/353 |
| 3,258,326 | 6/1966 | Rabussier..........................424/353 X |
| 3,419,626 | 12/1968 | Pyne et al. ........................424/353 X |
| 3,426,473 | 2/1969 | Cardarelli et al. .......................43/131 |
| 3,497,990 | 3/1970 | Jeffries ....................................43/131 |
| 3,505,758 | 4/1970 | Willisford ...............................43/131 |

FOREIGN PATENTS OR APPLICATIONS 852,882 11/1960 Great Britain............................21/58

*Primary Examiner*—Morris O. Wolk
*Assistant Examiner*—Barry S. Richman
*Attorney*—Davis, Lucas, Brewer & Brugman

[57] ABSTRACT

A system for controlling marine growth on submerged surfaces in which chemical anti-foulants are constantly permeated and diffused by absorption through a permeable non-porous membrane, preferably formed as a plastic sheath, having the inner surfaces thereof continuously supplied with the diffusable chemical from a replenishable supply; the plastic sheath being selected for non-destructible and controlled permeation by a selected chemical which is repugnant or toxic to limnological and marine growth. The membrane may be backed up by a non-permeable barrier to isolate permeation to the membrane and in certain instances to form a reservoir system with the membrane. The barrier structure so formed is readily submersible and presents an environmental contacting surface which is highly repellent to marine organisms.

7 Claims, 6 Drawing Figures

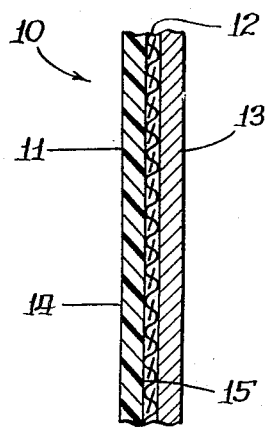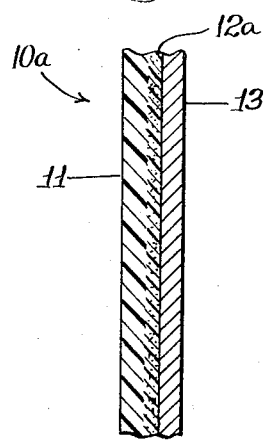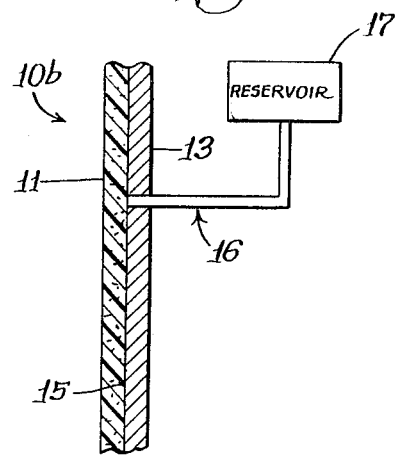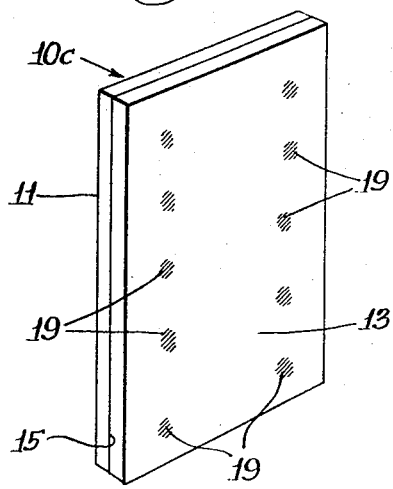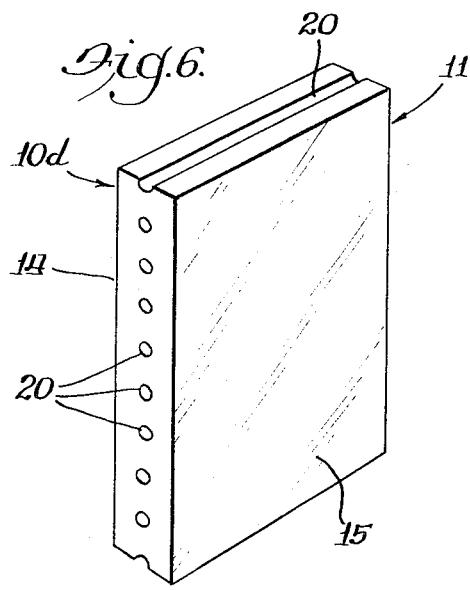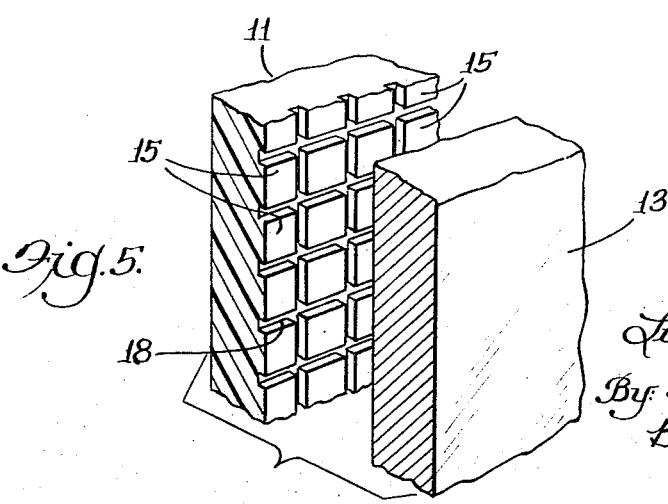

3,661,506

MEANS AND METHOD OF ELIMINATING AND CONTROLLING MARINE FOULING

This invention relates generally to marine biology and is particularly directed to a novel system for controlling biological growth on submerged surfaces and to improved anti-foulant compounds and control structures for such purpose.

Man's search for a satisfactory solution to the marine fouling problem reaches from ancient times to the present. During that period a vast array of materials, systems and devices have been presented with little lasting success. One of the earliest acceptable solutions was to sheath ship's hulls with lead. Later copper sheathing replaced the lead, but this too fell out of extensive use with the advent of iron hulls in the eighteenth and nineteenth centuries. Numerous anti-fouling coatings and paint compositions, largely ineffective, had been described and patented by the year 1867, typified by a composition of powdered iron, cement and an unnamed mineral (probably copper ore), patented in 1625.

One of the first successful anti-fouling compositions put into general use was patented in England in 1854 and comprised a hot mixture of copper sulfate in yellow soap applied over a primer of rosin varnish and iron powder. Cuprous oxide was first used in a paint for ship's bottoms around 1863.

The most frequently specified toxicants or anti-foulants in early and recent patents are copper, tin, arsenic and mercury and their various compounds. Other materials have been mentioned such as strychnine, atropine, oxides of zinc, lead and antimony, creosote, phenol, metalic silver, iodine, bromine and mixtures of iron, copper and zinc powders. Among unusual materials suggested in the past are oyster shells, powdered shell fish, seaweed ashes, tobacco extracts, plant extracts and a host of others. Ship's bottoms have been bathed in oil in which toxic materials have been suspended; bags containing phosphorous compounds have been dragged over the hull; perforated pipes attached to the keel and filled with sulfur, resin and fish oil have been employed to distribute these materials from time to time over the ship's bottom; chlorine and other gases have been released and distributed over the hulls of ships under motion, and gases and liquids lighter than water that have been released to ascend over the ship's hull to maintain turbulence in the water.

Many patents have been granted for alleged anti-fouling surfaces which supposedly prevented the attachment of fouling organisms including such materials as glass, vitrious glazes, sheets of graphite, cork, rubber, various resins, free sulfur and carbonated outer surfaces of wooden hulls. Also animals paints, radio active materials, porous materials on which marine materials would be unable to form a vacuum etc. have been suggested.

Electricity has been widely considered and systems for the use of electricity have been the subject of past patent protection including a patent to Thomas Edison for the application of direct current through the ship's hull. Alternating current applications and intermittent direct current applications, including magnetic fields have been employed as well.

Of the several thousand patents which have been issued on paints and systems claiming to control fouling, only a few paints have been found effective for limited periods. Of the many anti-fouling compounds suggested for paints and coatings only three groups, namely cuprous compounds, tin and mercury compounds have been useful, even in limited degree.

The most widely used poison for present day anti-fouling paints is cuprous oxide ($CU_2O$), while it must be noted that cupric oxide ($CUO$) is useless as an anti-fouling agent. Thus in utilizing cuprous oxide it is necessary to add an anti-oxidizing agent to the paint to prevent atmospheric oxidation to the inactive cupric form. Mercury compounds have also been used to a limited extent although they do not appear to be as effective as copper and are toxic to humans. Recently some tin compounds, notably tributyl tin oxide (TBTO) have been introduced and claimed to be highly effective (some 3 times more effective than copper). However, the cost is more than 10 times the cuprous compounds and effectiveness drops off rather abruptly as opposed to the tapering effect of copper. Other inorganic compounds such as arsenious oxide, zinc oxide and nickel compounds have proven of little value though recent work with zinc oxide indicates that such is capable of reinforcing the longevity of life effectiveness of copper as an anti-foulant.

Prevention of fouling by use of toxic paint involves the maintaining of a lethal concentration of poison in the sea water immediately adjacent the surface to be protected with a minimum requirement being in the neighborhood of 0.28 grams per square foot per month. Due to this requirement it is difficult therefore to maintain an anti-fouling coating or painted surface which will have a lasting effect. This factor is complicated further by the fact that faster motion of the ship or body through the water increases the rate of leaching the toxic compounds and thus lessens the overall life span of the coating.

In summation, it may be observed that the majority of anti-fouling devices and systems, other electrostatic paints conceived heretofore, have been largely ineffective. These include elastrostatic charges, magnetic pulses, supersonic vibrations, toxicants and gases or air bubbles over a ship's hull and a host of other proposals too numerous to mention herein. Fouling of submerged surfaces, as found on boats, buoys, anchor chains, pilings, conduits and the like, despite all the efforts over many centuries, remains a major operational and economic problem. Biologically, there are several thousand marine species capable of causing fouling, but serious fouling is due primarily to a relatively few types of organisms which attach to submerged surfaces, particularly when such surfaces are stationary or nearly so. Once such organisms have attached to the hull of a ship for example, they can remain and grow even when moving at high speed. Prevention of initial attachment appears to be the key to control and it is to this, that the present invention is directed.

In brief, this invention comprises a unique method and means for preventing fouling of submerged surfaces which involve the concept of continuously diffusing a suitable water insoluble anti-foulant chemical through a permeable, non-porous membrane, in novel submersible structures to present an anti-fouling barrier to marine environment. In its preferred form the barrier structure embodies a plastic outer sheath or membrane, a source of fluid chemical repellent continuously supplied over the inner face of the membrane and in certain instances a non-permeable barrier, backing up the permeable membrane is employed to strengthen the structure and control the direction of diffusion of the permeant.

It is an important object of this invention to provide an improved method for repelling marine and limnological growth from submerged surfaces and structures.

Another object of this invention is to provide improved anti-foulant marine barrier structures operable with selected anti-foulant compounds to control and deter underwater deposit of marine growth on submerged objects.

Another important object of this invention is to provide improved means for controlling marine fouling.

Having thus described the present invention the particulars of the best mode presently contemplated for carrying out its concepts will now be set forth with reference to the accompanying drawings:

In the drawings:

FIG. 1 is a cross-sectional view of a barrier structure according to this invention;

FIG. 2 is a cross-sectional view, similar to FIG. 1, of a modified barrier structure;

FIG. 3 is a cross-sectional view of an additional modified barrier combination;

FIG. 4 is a perspective showing of an additional modified barrier structure employing capillary distribution means;

FIG. 5 is an exploded partial perspective view, at enlarged scale, of the structure shown in FIG. 4; and FIG. 6 is a perspective showing of a unitary diffusible barrier structure embodying anti-foulant distribution means.

BARRIER STRUCTURE

As best illustrated in FIG. 1, the basic barrier structure 10 for controlled diffusion of anti-fouling materials, according to the above outlined concepts of this invention, comprises a permeable membrane member 11, formed of sheet plastic material or the equivalent thereof, having a thickness in the order of 1/32–3/16 inches, laminated over a manifold means or layer 12 and a non-permeable backing layer 13. The laminated barrier structure 10 so formed is adapted to be coupled in operation to a supply source or reservoir (see FIG. 3) storing fluid anti-foulant compounds and communicating with the manifold layer 12.

Essentially to carry out the concepts of this invention, a permeable membrane 11, having an outer surface 14 subject to marine or limnological growth and either non-porous, but permeable to fluids other than water or alternatively porous and non-wettable by water, but wettable by other fluids, is required. It is further preferred that membrane 11 be constantly supplied and wetted on its inner face 15 with a chemical anti-foulant, preferably in liquid form, capable of passing through layer 11 or, that is, permeating the same (diffusion by absorption, not to be confused with porosity). To this latter end the manifold means or layer 12 coupled to a reservoir supply, or the equivalent thereof, is employed.

The manifold means 12 by which a continuous supply of anti-foulant is provided on the inner face 15 of membrane 11, may constitute a body of liquid in direct contact with face 15 or any suitable porous material such as cloth, canvas, wicking, foam plastic, sponge or the equivalent thereof, capable of maintaining a supply of chemical adjacent face 15.

The backing layer 13 in the FIG. 1 structure may comprise any material impervious to the fluid anti-foulant, as for example metal, inert to the chemical compound employed, or a plastic sheeting selected to be impervious to the anti-fouling compound. In this respect, while a reservoir means has heretofore been mentioned as being coupled to the manifold 12, it will be appreciated that the barrier structure 10 illustrated utilizing a wick layer 12 and impervious barrier or wall 13, itself comprises a reservoir whereby supply fluid may be stored in the wicking layer 12. It will be understood, of course, that with structure 10 it is necessary to replenish the supply of fluid in wicking layer 12 from time to time in order to maintain the inner face 15 of membrane 11 properly supplied.

In the modified structure 10a of FIG. 2, the separate manifold layer 12 of the above-described structure 10 is eliminated by providing a porous inner surface or portion 12a on membrane layer 11. This may be accomplished for example, by "ironing" one surface of an expanded, open cell permeable, plastic to close the pores or densify that surface, (portion 12a in FIG. 2). Alternatively if greater strength is needed, portion 12a may be a layer of sintered metal or ceramic bonded to the inner face 15 of membrane 11. In either event, as illustrated, a non-permeable backing 13 is sandwiched with the layers 11 and 12a in the FIG. 2 structure. In this particular barrier structure, flow of fluid anti-foulant in layer 12a is effected by external pressure head or by capillarity.

In FIG. 3 the modified structure 10b illustrated avoids the inner manifold layer 12 or 12a previously described. Instead, fluid is supplied directly over the inner face 15 of membrane 11 by one or more tubes or conduits 16 transiting backing layer 13 and communicating directly with reservoir 17 and the spacing between inner face 15 of membrane 11 and backing layer 13.

In FIGS. 4 and 5 a modified structure 10c is illustrated in which a permeable membrane 11 is provided with a network of conducting channels 18, either capillary or non-capillary, formed in its inner face 15. The non-permeable backing layer 13 is then bonded as by spot bonds 19 directly to inner face 15, providing a two layer sandwich or laminated structure in which the pattern of conduits 18 acts to distribute fluid to the permeable membrane 11 (see FIG. 4).

In FIG. 6 a monolithic or unitary barrier structure 10d is illustrated. In this form, a single sheet or permeable membrane layer 11 is provided with a plurality of internal conduit passageways 20 to form a unitary structure. Fluid anti-foulant is supplied to the passageways 20 from a suitable reservoir (not shown) communicating therewith. Such a barrier is capable of diffusing fluid through both surfaces 14 and 15 thereof. If unidirectional diffusion flow is desired, face 15 of structure 10d may be coated with an impervious plastic or backed up with a metal laminate layer such as backing layer 13 in the FIG. 1 and 2 structures.

MEMBRANE MATERIALS

Of prime importance to the successful practice of this invention is the selection of the proper material for the membrane layer 11, in any of the above-described barrier structures or their equivalents. Of several considerations determining the selection of the proper membrane material, whether it be in the form of plastic sheet, film or otherwise, the foremost is its permeability by a selected chemical without deterioration. Other considerations include workability, adhesion to other materials, such as the layer 12 (FIG. 1), commercial availability in the form required, cost, adaptability for application to marine structures, resistance to weathering, toughness, resistance to abrasion and cutting, and the like.

The membrane materials selected preferably should be permeable to compatible chemical anti-foulant compounds so as to provide approximately 2-4 milligrams of anti-foulant per square foot of surface exposed to the marine environment (i.e., surface 14) per month for good workable results. Such permeability is measured at still water conditions, inasmuch as moving water produces a scrubbing action which tends to deteriorate the concentration of chemical at the exposed surface.

Plastic materials found serviceable for purposes of this invention according to the above-indicated requirements can be characterized chemically as those which are derived (polymerized) from compounds having an ethylenic linkage, that is where the polymer is formed from compounds having a $-C = C-$ group. This includes the polyethylenes, formed from ethylene $H_2C = CH_2$; polypropylenes, formed from propylene $CH_3-HC = CH_2$; polyvinyl chlorides, formed from vinyl chloride $H_2C = CHCl$; polystyrenes, formed from styrene $C_6H_5-HC = CH_2$; and acrylic resins formed from methacrylic esters such as $HC = C(CH_3)-COOCH_3$.

Typifying materials of the above classification are the polyolefins; including polyethylenes and polypropylenes of various densities, copolymers of ethylene and propylene; the chlorinated polyolefins: including polyvynilidine chloride, polyvinyl chlorides, chlorinated rubber, and neoprene; and ester resins including urethanes, alkyds, diallylphthalates, and polyesters.

It will be recognized from the description of the chemical anti-foulants which appear hereinafter that while the ethylenic linkage plastic compounds are operationally satisfactory, all such materials are not universally suitable for use with all anti-foulants inasmuch as many of the preferred anti-foulant compounds are solvents for one or more plastics of this grouping. Thus, it is essential that the plastic material selected be compatible with the selected chemical anti-foulant to avoid destruction of the plastic membrane by the anti-foulant. This selection, however, is within the normal skill of the art and will not be dwelt on particularly herein.

ANTI-FOULANT MATERIALS

In the course of perfecting the present invention, various chemicals were examined to determine the requirements for practical application to a marine anti-fouling system. Among other factors, it was determined that practical workability demanded repellent or anti-foulant materials which are characterized by: relatively low volatility; are substantially non-toxic to human life; are low in odor value; are capable of permeating the plastic membrane materials at an effective rate sufficient to provide substantially 2–4 milligrams per square foot per month at the environment exposed surface of the membrane, and are relatively stable to light, water, heat and oxidation. Further an effective practical anti-foulant of this order should be non-corrosive to metals and should not form corrosive compounds with the sea water and should not damage the plastic membrane, textiles, wood or other materials with which it comes into contact in operation. It should be safe and stable to handle and non-injurious to human organs such as the skin, eyes, nose etc. and should be non-inflamable. Particularly, the material selected should be generally insoluble in water and readily available commercially, at reasonable cost.

Within the above-indicated parameters it was discovered that certain halogenated compounds, having a particular atomic configuration, met the necessary criteria and are both satisfactory anti-foulants and permeants. More importantly, it was discovered that only halogenated chemical compounds having the following atomic structure are effective anti-foulant permeants for purposes of this invention:

where: "X" is any halogen (Chlorine, Bromine, Iodine): and "Y" is Hydrogen, a Halogen or Carbon.

The following compounds, meeting the foregoing requirements are considered effective anti-foulants according to this invention:

EFFECTIVE 1,2 dichlorethylene
1,1 dichlorethylene
1,3 dichlorpropylene
trichlorethylene
tetrachlorethylene
monochlorbenzene
dichlorbenzene
trichlorbenzene
tetrachlorbenzene
pentachlorbenzene
hexachlorbenzene
brom benzene
iodo benzene
o-chlortoluene
m-chlortoluene
p-chlortoluene (solution)
mixed chlortoluenes
2,4 dichlortoluene
chlorstyrene
1,2,4 trichlorbenzene
mixed trichlorbenzenes
hexadichlorocyclopentadiene
o-chlor phenol Of the above listed materials tetrachlorethylene and the chlorinated aromatics, such as the mono-hexachlorbenzenes are preferred for use with polyethylene and polypropylene membranes by way of example. It should be noted that selection of the proper membrane material for a selected anti-foulant is essential. For instance, while polyvinyl chloride dissolves in trichlorethylene, it is usable with trichlorbenzene. The basic criteria for compatibility is the selection of an anti-foulant compound which is permeable to, but non-destructive of the membrane material, a matter readily determined by one normally versed in the art.

From the foregoing, it will be appreciated that the fundamental teachings hereinabove disclosed provide a unique and novel means and method of preventing and/or controlling the fouling of submerged objects and surfaces subjected to salt or fresh water environments. While the barrier structure described is readily adapted to protect a variety of submerged objects such as boat hulls, piers, pilings, buoys, anchors, submerged conduits and the like; the drawings illustrating only portions of barrier structures comprising larger sheets or sheathing materials, one of the more practical applications of this invention is in the construction of a hollow vessel in the shape of a buoy. In such a buoy the walls are of permeable plastic and contain a body of liquid anti-fouling permeant-repellent operable in accordance with the above teachings. Prolonged use of such a buoy in salt water has proven the effectiveness of this invention and the capability of anti-foulants, of the order hereinabove specified, to permeate the plastic hull or body of the buoy and effectively prevent the accumulation, attachment and/or growth of marine organisms thereto so long as the supply of anti-foulant is maintained in wetting contact with the inner walls of the buoy body.

I claim:

1. A method of controlling marine growth on submerged objects comprising the steps of: shielding the object to be protected with an uninterrupted non-porous barrier membrane of plastic selected from the class of non-elastomeric polyolefins, chlorinated polyolefins and ester resins derived from compounds having an ethylenic linkage (—C  C—); and maintaining the surface of said membrane, which is unexposed to marine environment, constantly wetted with a water insoluble normally liquid anti-foulant consisting essentially of a halogenated compound having the atomic configuration:

wherein $X$ is a Halogen, and $Y$ is Hydrogen, a Halogen or Carbon; said anti-foulant being selected to be diffusible by absorption through and non-destructible of said plastic membrane.

2. The method of claim 1 wherein said membrane plastic is polyethylene and said liquid anti-foulant is tetrachlorethylene.

3. The method of claim 1, wherein said compound is a member selected from the group of: 1,2 dichlorethylene, 1,1 dichlorethylene, 1,3 dichlorpropylene, trichlorethylene, tetrachlorethylene, monochlorbenzene, dichlorbenzene, trichlorbenzene, tetrachlorbenzene, pentachlorbenzene, hexachlorbenzene, brom benzene, iodo benzene, o-chlortoluene, m-chlortoluene, p-chlortoluene, mixed chlortoluenes, 2,4 dichlortoluene, chlorstyrene, 1,2,4 trichlorbenzene, mixed trichlorbenzenes, hexadichlorocyclopentadiene, and o-chlor phenol.

4. An anti-fouling marine barrier comprising a non-porous, non-elastomeric, plastic membrane presenting an outer surface exposed to marine environment and consisting of a member selected from the group of polyolefins, chlorinated polyolefins and ester resins derived from compounds having an ethylenic linkage (—C = C—); a replenishable supply of a normally liquid chemical repellent selected to be non-destructible to and diffusible through said membrane and consisting essentially of a halogenated compound having the atomic configuration:

wherein $X$ is a Halogen, and $Y$ is Hydrogen, a Halogen or Carbon; and means communicating with said supply for constantly distributing said repellent over the inner surface of said membrane whereby to render said outer surface thereof repugnant to marine organisms.

5. The combination of claim 4 and further including a back-up layer, non-permeable to said repellent, mounted adjacently over the inner face of said membrane.

6. The combination of claim 4 wherein said repellent is a member of the group consisting essentially of: 1,2 dichlorethylene, 1,1 dichlorethylene, 1,3 dichlorpropylene, trichlorethylene, tetrachlorethylene, monochlorbenzene, dichlorbenzene, trichlorbenzene, tetrachlorbenzene, pentachlorbenzene, hexachlorbenzene, brom benzene, iodo benzene, o-chlortoluene, m-chlortoluene, p-chlortoluene, mixed chlortoluenes, 2,4 dichlortoluene, chlorstyrene, 1,2,4 trichlorbenzene, mixed trichlorbenzenes, hexadichlorocyclopentadiene, and o-chlor phenol.

7. The combination of claim 4, wherein said membrane is polyethylene and said repellent is tetrachlorethylene.

* * * * *

PO-1050
(5/69)

UNITED STATES PATENT OFFICE
CERTIFICATE OF CORRECTION

Patent No. 3,661,506           Dated  May 9, 1972

Inventor(s) LUCIUS D. WATKINS

It is certified that error appears in the above-identified patent and that said Letters Patent are hereby corrected as shown below:

IN THE SPECIFICATION:

Col. 1, l. 47 - "animals" should be --luminous--;

Col. 1, l. 49 - "materials" should be --animals--;

Col. 2, l. 19 - "electrostatic" should be --than--;

Col. 3, l. 23 - comma (,) should be a dash (-).

IN THE CLAIMS:

Col. 6, l. 24 - (-C C-) in Claim 1 should be (-C=C-).

Signed and sealed this 29th day of August 1972.

(SEAL)
Attest:

EDWARD M. FLETCHER, JR.
Attesting Officer

ROBERT GOTTSCHALK
Commissioner of Patent